United States Patent [19]
Baldi

[11] 3,822,814
[45] July 9, 1974

[54] BUMPER MOUNTED SPARE WHEEL CARRIER

[76] Inventor: Nick A. Baldi, 36 Genie Way, Longmont, Colo. 95240

[22] Filed: Apr. 26, 1973

[21] Appl. No.: 354,740

[52] U.S. Cl.............. 224/42.06, 214/454, 224/21, 224/25
[51] Int. Cl........................................... B62d 43/02
[58] Field of Search........... 224/42.06, 42.21, 42.24, 224/42.25, 42.43, 42.08, 42.03 R, 42.12, 29 R; 214/450, 451, 452, 453, 454

[56] References Cited
UNITED STATES PATENTS

| | | | |
|---|---|---|---|
| 1,423,194 | 7/1922 | Lorbett............................ | 224/42.25 |
| 2,698,118 | 12/1954 | Dickason......................... | 224/42.21 |
| 3,343,736 | 9/1967 | Sellers............................. | 224/42.06 |
| 3,613,971 | 10/1971 | Betz................................. | 224/42.21 X |
| 3,669,326 | 6/1972 | Podraza........................... | 224/42.21 |

Primary Examiner—Robert G. Sheridan
Assistant Examiner—Jerold M. Forsberg
Attorney, Agent, or Firm—Burton, Crandell, Polumbus & Harris

[57] ABSTRACT

A bumper mounted spare wheel carrier for pickup trucks or other vehicles for normally supporting a spare wheel in a generally vertical position behind and primarily above the bumper and swingable about a horizontal axis to a position where the wheel rests upon the ground to permit opening of a tailgate or door blocked by the wheel in its normal position. An elongate arm is pivotally mounted at one end upon a mounting bracket adapted to be attached to the bumper of a vehicle. An inclined armrest fixedly mounted on the bracket establishes a normal rest position of the arm in which the arm is inclined upwardly to one side of its point of pivotal attachment to the mounting bracket. Spare wheel mounting means are located upon the arm approximately midway of the length of the arm, the arm being of a length such that the end of the arm remote from the pivot projects radially beyond the periphery of a wheel mounted upon the wheel mounting means. A latch is provided for latching the arm in its normal wheel carrying position against the armrest, the latch including a latch actuator accessible at the remote or outer end of the arm. A lock assembly for locking the wheel in place on the carrier includes an angle member of "L"-shaped transverse cross-section having a stud receiving bore through one web by means of which the angle member is clamped against the wheel by the wheel retaining nut on the stud. A retainer member of sheet metal or similar material is formed with a closed loop dimensioned to loosely surround the nut, while a tangentially projecting arm portion integral with the loop lies against the other web of the angle member. Aligned bores through the arm portion and other web of the angle member provide a means whereby the retainer member may be padlocked to the angle member, the loop portion surrounding the nut and prohibiting access to the nut flats thereby to prevent removal of the nut without first removing the retainer member.

1 Claim, 12 Drawing Figures

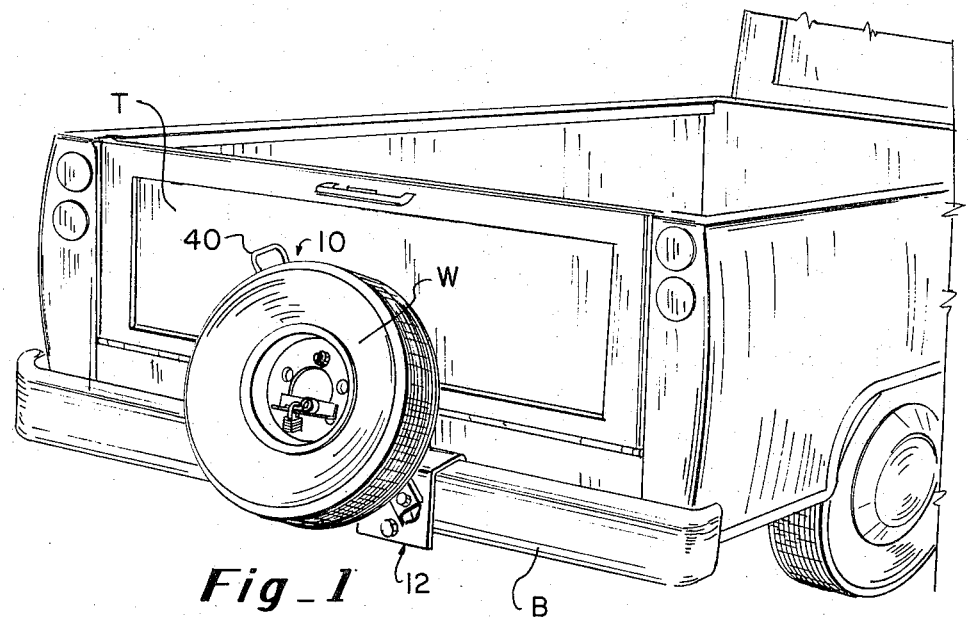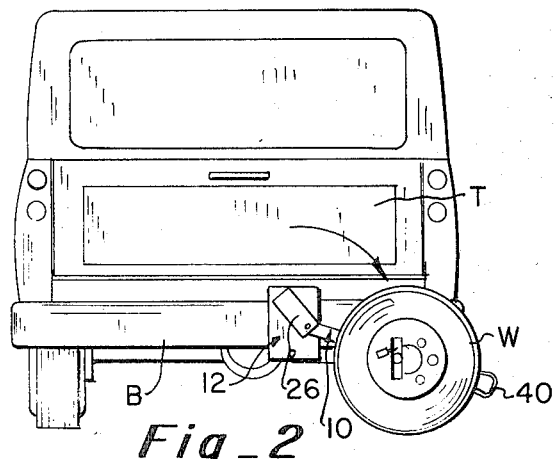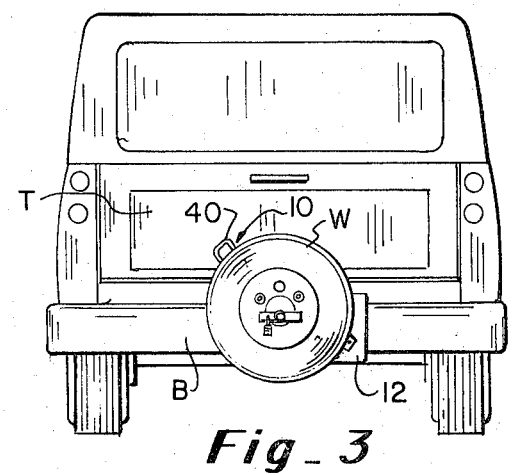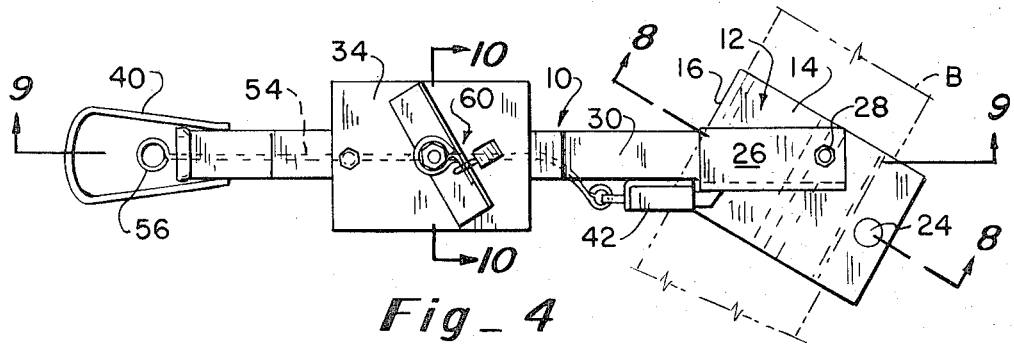

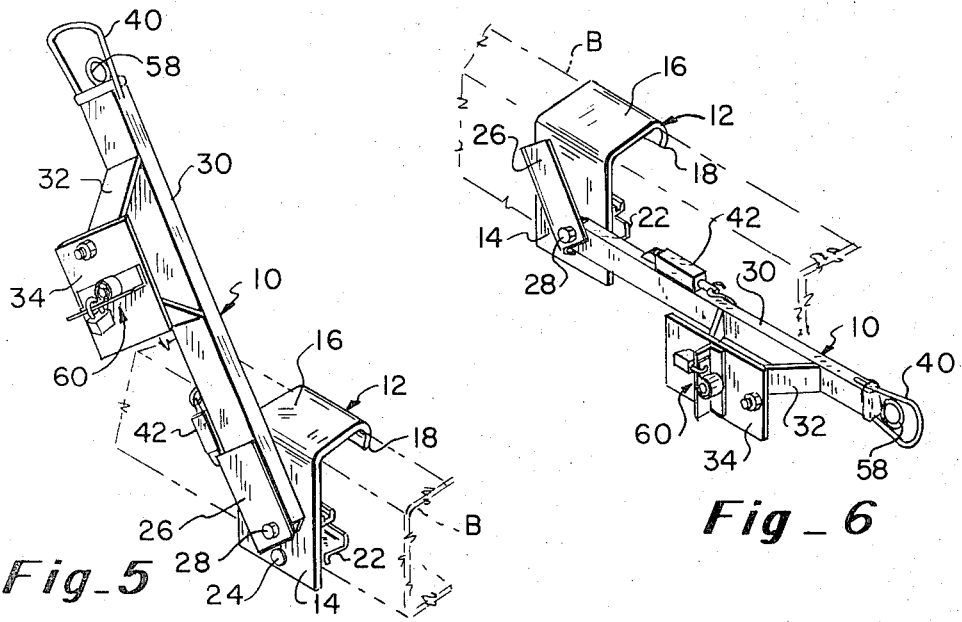
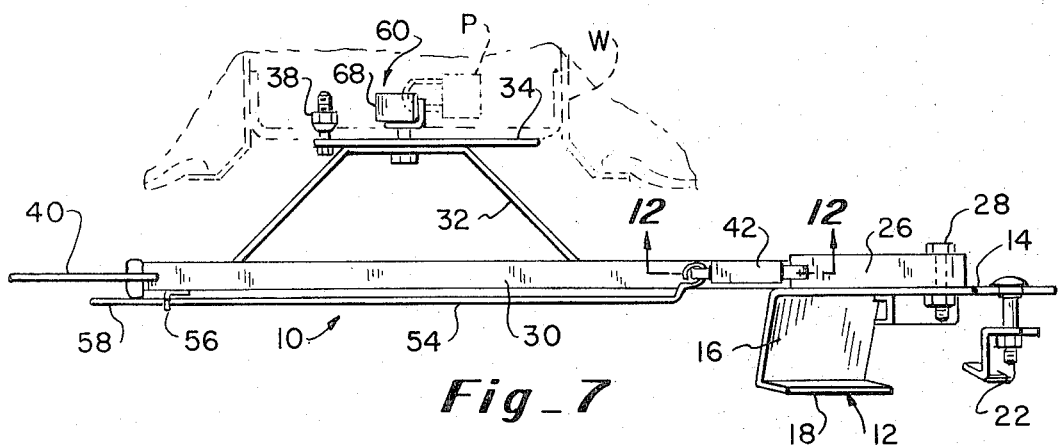
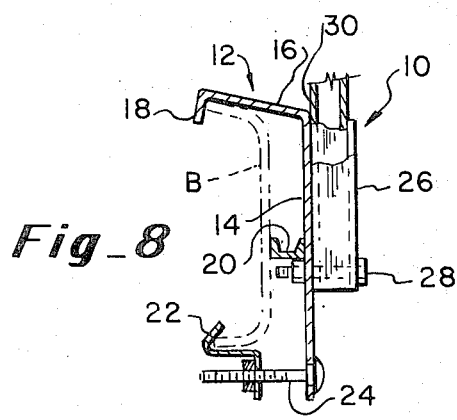

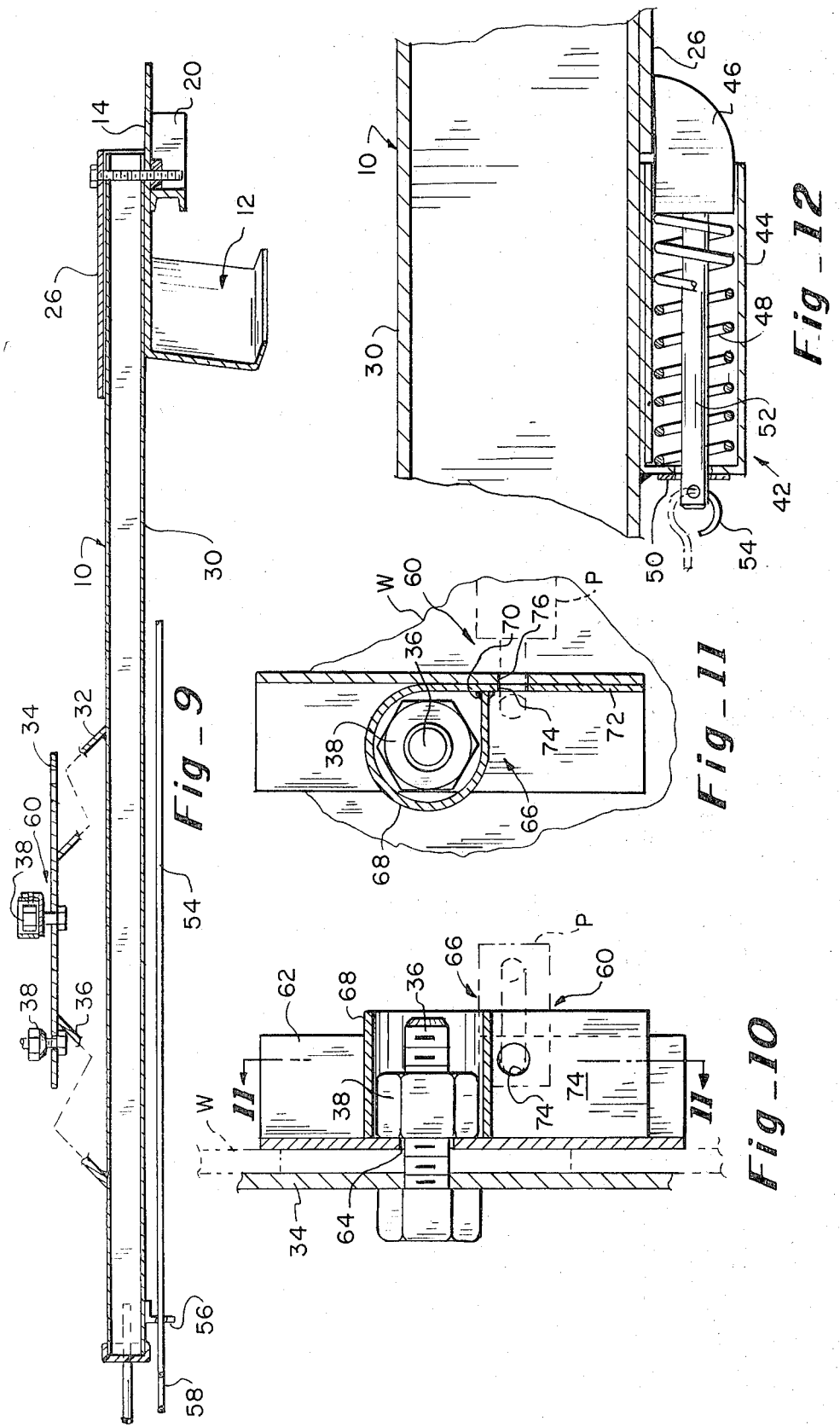

BUMPER MOUNTED SPARE WHEEL CARRIER

BACKGROUND OF THE INVENTION

The present invention is especially designed for use with pickup trucks, recreational vehicles, trailers, etc. where it is desired to carry a spare wheel on a bumper mount. Nearly all of such vehicles have a tailgate or door at the rear which is blocked by a spare wheel carried on the rear bumper and thus, in the design of a wheel carrier of this type, it is necessary to include in the carrier some structure which enables the spare wheel to be rapidly and conveniently shifted to a position clear of the gate or door opening. Several examples of wheel carriers of this type are found in the prior art, as, for example, in U.S. Pat. No. 3,669,326.

In U.S. Pat. No. 3,669,326 there is disclosed a spare wheel carrier in which the spare wheel is mounted upon an arm pivoted at one end for movement about a horizontal axis upon a bumper mounting bracket. This type of mounting permits the spare wheel to normally be located in a vertical position behind and generally above the vehicle bumper, from which position the arm and spare wheel may be swung about the horizontal pivot to a position where the wheel rests upon the ground at a location clear of the tailgate or door opening.

The present invention is directed to a spare wheel carrier of the general type disclosed in U.S. Pat. No. 3,669,326 but which incorporates certain improvements and modifications which enable the wheel carrier to be easily shifted between its positions and which also includes a locking means of simple and efficient construction for locking the wheel to the carrier.

SUMMARY OF THE INVENTION

The present invention includes a mounting bracket adapted to be bolted or clamped to the rear bumper of a vehicle. An elongate rigid arm is pivotally mounted at one end upon the bracket for pivotal movement about a horizontal axis which extends longitudinally of the vehicle. An armrest is fixedly mounted upon the bumper bracket in a position inclined upwardly to one side of the arm pivot to establish a normal rest position for the arm in which the arm is inclined upwardly from its pivotal mount to one side of a vertical line passing through the pivot axis. The spare wheel is mounted upon the arm on a wheel mounting bracket located approximately midway of the length of the arm, the wheel mounting bracket including a plate from which two or more studs project to pass through the lug holes of the spare wheel. Nuts threaded onto the studs hold the wheel in place.

Because the spare wheel is carried in an exposed position, some precaution against theft of the wheel is desirable and a locking assembly is provided which shields at least one of the wheel retaining nuts in a manner such that the nut flats are not accessible to a wrench or fingers. The locking assembly includes a length of angle iron including a stud receiving bore through one web. The angle iron is clamped against the spare wheel between the nut and the wheel and thus cannot be removed without removing the nut. A retainer member, which may be formed from sheet metal or similar material, is formed with a loop section having an axial thickness at least equal to that of the nut and dimensioned to loosely surround the nut. An integral tangentially projecting arm portion extends from the loop and is adapted to lie against the other web of the angle member when the loop surrounds the nut. Aligned holes through the arm portion and other web of the angle member enable the retainer member to be padlocked to the angle member.

The arm of the wheel carrier is extended to project radially beyond the periphery of a spare wheel mounted on the carrier and a handle at the distal end of the arm is easily accessible to swing the carrier and handle between the normally maintained carrying position and a position where the wheel rests on the ground. By thus extending the length of the arm, it is not necessary to grasp the tire to shift the spare wheel and a substantial amount of leverage to reduce the physical effort in shifting the carrier between its positions is provided. A sliding latch is provided on the arm to latch the arm to the armrest to maintain the carrier in its normal position. A latch actuator accessible at the remote or distal end of the arm is provided for releasing the latch.

Other objects and features of the invention will become apparent by reference to the following specification and to the drawings.

In the drawings:

FIG. 1 is a perspective view of the rear end of a vehicle showing a spare wheel carrier embodying the present invention;

FIG. 2 is a rear view of the vehicle of FIG. 1 showing the spare wheel in its ground supported position clear of the rear opening of the vehicle;

FIG. 3 is a rear view showing the carrier with the wheel in its normal supported position;

FIG. 4 is a rear view of the carrier in the position of FIG. 3, the vehicle bumper being indicated in broken line and inclined to accomodate this view on the sheet;

FIG. 5 is a perspective view of the carrier in its normal wheel supporting position;

FIG. 6 is a perspective view showing the carrier swung to a clear position;

FIG. 7 is a top view of the carrier with a wheel portion indicated in broken line;

FIG. 8 is a detail cross-sectional view through the bumper mounting bracket taken on line 8—8 of FIG. 4;

FIG. 9 is a cross-sectional view taken approximately on line 9—9 of FIG. 4;

FIG. 10 is a detail cross-sectional view showing details of the locking assembly taken on line 10—10 of FIG. 4;

FIG. 11 is a cross-sectional view taken on line 11—11 of FIG. 10; and

FIG. 12 is a detail cross-sectional view of a portion of the latching mechanism taken on line 12—12 of FIG. 7.

Referring first to FIGS. 1-3, a spare wheel carrier embodying the present invention is disclosed mounted upon the rear bumper B of a vehicle. In the particular example shown in the drawings, the vehicle takes the form of a pickup truck having a tailgate T which is blocked by the spare wheel W when the wheel is supported by the carrier in its normal storage position. As best seen from a comparison of FIGS. 2 and 3, the carrier includes an arm designated generally 10, largely obscured by the wheel in these views, which is pivotally mounted upon a bumper mounting bracket designated generally 12 for pivotal movement between a normally maintained storage or carrying position shown in FIGS. 1 and 3 and a ground supported position shown in FIG. 2 in which the wheel is supported on the ground clear of the path of movement of tailgate T.

Structural details of the wheel carrier are best seen in FIGS. 4–12, most of these latter figures showing the construction of the carrier per se.

Referring first particularly to FIGS. 4, 5, 6 and 8, the bumper mounting bracket 12 includes a flat vertically disposed main plate 14 whose upper end is bent forwardly as at 16 and formed with a downwardly projecting hooklike flange 18 along its forward edge. As best seen in FIG. 8, flange 18 is adapted to hook downwardly below the upper edge of a bumper B while main plate 14 is braced in a generally vertical position by a channel member 20 welded to the forward side of plate 14 and located to engage the outer surface of the bumper. Bracket 12 is held in position upon the bumper by a hook shaped plate 22 adapted, as best seen in FIG. 8, to hook around the lower edge of the bumper B, a nut and bolt assembly 24 being tightened to clamp the bracket onto the bumper. An armrest in the form of a piece of angle iron 26 is fixedly secured as by welding to the rear surface of main plate 14 to extend in a vertically inclined direction to form, in cooperation with main plate 14, an upwardly inclined channel of U-shaped configuration. A bolt 28 fixedly mounted to extend between the outer web of armrest 26 and main plate 14 establishes a pivotal mounting for arm 10 at the lower end of armrest 26, the armrest thus establishing a positive limit stop to pivotal movement of arm 10 in one direction.

Arm 10 includes a main member 30 of hollow tubular cross-section dimensioned to be slidably received within the U-shaped channel defined by armrest 26 and main plate 14. A wheel mounting bracket 32 which includes a mounting plate 34 is fixedly secured to main member 30 of arm 10 at a location intermediate the ends of main member 10. Wheel mounting studs in the form of two or more bolts 36 (FIG. 10) are fixedly secured, as by welding, to mounting plate 34 and located upon the plate to match up with the lug holes of the spare wheel to be carried on the carrier. Normally, two studs 36 will be sufficient to secure the wheel to the carrier. Nuts 38 threaded onto studs 36 are employed to hold the wheel in its mounted position.

As best seen in FIGS. 1–3, the length of arm assembly 10 is such that a handle member 40 fixedly secured, as by welding, to the distal end of arm assembly 10 projects radially beyond the periphery of the spare wheel W when the wheel is mounted upon the carrier. Two important advantages are achieved by so extending the length of arm 10. First, because handle 40 projects beyond the periphery of the wheel, the handle may be easily grasped to shift the wheel between the FIG. 2 and FIG. 3 positions without coming into contact with the wheel. Second, the substantial length of arm assembly 10 provides a greater leverage or mechanical advantage to reduce the manual effort required to swing the wheel about the pivot axis defined by pivot 28.

When the carrier is disposed in the normal storage or carrying position, as shown in FIGS. 1 and 3, main member 30 of arm assembly 10 extends from its pivot point 28 to lie within and be supported by armrest 26 as best seen in FIG. 5. In this position, the arm is inclined well to one side of a vertical line passing through pivot 28 and hence the weight of the arm, particularly when the wheel is mounted upon the arm, tends to gravitationally maintain the carrier in the FIG. 5 position. However, when mounted upon a vehicle, up and down movement of the vehicle occasioned by bumps in the road can be sufficient to jar the carrier upwardly beyond the vertical position, and thus a latch assembly designated generally 42 is provided to mechanically latch arm assembly 10 in the FIG. 5 position.

Referring to FIG. 12, latch assembly 42 includes a housing 44 fixedly secured, as by welding, to main member 30 of arm assembly 10. A latch tooth 46 is slidably received within housing 44 and biassed to a latching position shown in FIG. 12 by a latch spring 48. A retaining washer 50 secured to a shaft 52 fixedly secured to tooth 46 limits outward movement of tooth 46 from housing 44. A latch actuating rod 54 is hooked to shaft 52 and extends outwardly along main member 30 to pass through a guide bracket such as 56 and terminate at its outer end in a finger loop 58 located adjacent the distal end of main member 30. By inserting a finger in loop 58 and pulling rod 54 outwardly of the arm assembly, latch tooth 46 can be retracted against spring 48 into an unlatched position wherein the tooth is entirely within housing 44. As best seen in FIG. 12, housing 44 is located to be just beyond the outer end of armrest 26 when arm assembly 10 is in its stored position, latch tooth 46 projecting from housing 44 to underlie the bottom web of armrest 26 to thereby latch arm assembly 10 in its stored position. Like handle 40, finger loop 58 of actuating rod 54 projects radially beyond the wheel periphery.

To prevent unauthorized removal of the spare wheel from the carrier, a locking assembly designated generally as 60 is provided. Details of the locking assembly are best seen in FIGS. 10 and 11. Assembly 60 includes a short length of angle iron of L-shaped cross-sectional configuration 62 having a bore 64 through one web providing passage for stud 36. In use, angle member 62 is clamped by nut 38 against the outer side of wheel W and a sheet metal retainer member designated generally 66 is positioned in surrounding relationship with the nut. Retainer member 66 is formed from sheet metal or similar material by bending one end of a strip of the material into a closed loop 68 and welding the end of the loop as at 70 to provide an integral tangentially projecting arm portion 72. As best seen in FIG. 10, the axial dimension of loop 68 is at least equal to and preferably exceeds, as shown in FIG. 10, the axial dimension of nut 38. The diameter or inner dimensions of loop 68, as best seen in FIG. 11, slightly exceed the dimensions of nut 38 so that the flats of the nut become inaccessible when loop portion 68 encloses the nut. A bore 74 in arm portion 72 is located to be in alignment with another bore 76 in the other web of angle member 62 so that a padlock P can be employed to lock retainer member 66 in the position shown in FIG. 10.

It may be noted that the locking assembly is equally useful for substantially all forms of nuts or bolt heads formed with external wrench receiving flats. A locking assembly 60 may likewise be used to shield the nut of the bumper bracket mounting bolt assembly 24.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. A bumper mounted spare wheel carrier comprising:

a mounting bracket adapted to be secured to a vehicle bumper;

an arm mounted at one end upon said bracket for pivotal movement about a horizontal axis;

a channel shaped arm rest member fixedly mounted on said bracket, said arm rest member being inclined upwardly from said horizontal axis and defining an arm receiving pocket for receiving and supporting said arm in a wheel carrying position wherein said arm is inclined to one side of a vertical line passing through said axis;

a wheel mounting plate fixedly secured to said arm intermediate the ends thereof with the arm projecting beyond said wheel mounting plate by a distance such that the outer projecting end of said arm remote from said horizontal axis extends radially beyond the periphery of a wheel rim and tire mounted on said plate;

said wheel mounting plate having threaded studs projecting therefrom and located to pass through stud openings in a spare tire wheel rim for receiving a hexagonal nut for clamping said wheel rim to said plate;

an angle member of L-shaped transverse cross-section having a first bore through one web thereof for receiving one of said threaded studs for accommodating clamping of said angle member to said wheel rim by a nut threaded on said stud;

a retainer member having a closed loop and an integral arm portion projecting tangentially from said loop, said loop being dimensioned to circumferentially surround said nut and having an axial dimension exceeding the axial thickness of said nut;

means defining a first bore in the arm portion of said retainer member and a second bore in the other of said webs of said angle member located to be in axial alignment with each other when said retainer is seated on said one web with said loop surrounding said nut, said aligned first and second bores accommodating the padlocking of said retainer to said angle member;

a latch member slidably mounted for reciprocating movement on said arm for latching said arm to said arm rest member to retain said arm against pivotal movement away from said arm rest member;

spring means on said arm biasing said latch member towards its engaged position with said arm rest member; and a pull member operatively coupled to said latch member and extending along said arm to the outer end thereof for use in releasing said latch member from engagement with said arm rest member, said pull member being accessible for releasing said latch member when a tire and rim is supported and locked on said arm without necessitating the removal of said tire and rim from said arm.

* * * * *